United States Patent

[11] 3,613,910

[72] Inventor Stanley M. Weir
Palo Alto, Calif.
[21] Appl. No. 20,711
[22] Filed Mar. 18, 1970
[45] Patented Oct. 19, 1971
[73] Assignee FMC Corporation
San Jose, Calif.

[54] WAREHOUSE SYSTEM WITH INFEED AND DISTRIBUTING CONVEYORS SERVING STACKER CRANES IN A COMMON AISLE
16 Claims, 21 Drawing Figs.

[52] U.S. Cl. ..................................... 214/16.4 A,
214/16.1 CB, 214/38 D
[51] Int. Cl. ........................................ B65g 1/06
[50] Field of Search ........................... 214/16.4 R,
16.4 A

[56] References Cited
UNITED STATES PATENTS
2,096,958 10/1937 Clerc ........................... 214/16.4 A
2,815,133 12/1957 Asheim et al. ................ 214/16.1 (8A)
3,075,655 1/1963 Bryant ......................... 214/16.1 (8A)
3,405,817 10/1968 Alimanestianeur .......... 214/16.1 (4-B)
3,519,148 7/1970 Lemelson .................... 214/16.4 A
FOREIGN PATENTS
1,035,237 6/1966 Great Britain ................ 214/16.4 A
57,826 7/1946 Netherlands ................. 214/16.4 A Primary Examiner—Gerald M. Forlenza
Assistant Examiner—Raymond B. Johnson
Attorneys—F. W. Anderson, C. E. Tripp and J. F. Verhoeven ABSTRACT: An automatic freight-handling terminal is disclosed with conveyor booms for loading and unloading freight to/from such transported containers, or carriers, as truck trailers, railcars, and aircraft igloos. Computer controlled equipment sorts, accumulates and moves freight from one loading-unloading conveyor boom to another. The loading-unloading conveyor boom is vertically adjustable with a ramp pivotally attached at one end that can be independently tilted up or down. The ramp has a set of movable wedge-shaped finger members for moving freight from its wedge-shaped finger tips to the conveyor boom or vice versa. All motions of the loading-unloading conveyor boom are controlled by an operator working in the vicinity of the ramp. The loading-unloading boom is of fixed length, and is pivoted by a motorized cart that also moves an air-bearing supported platform on which a freight carrier or container rests, backward or forward and sideways left or right.

Shipments are conveyed from loading-unloading booms to transfer stations where they are picked up by extendable stacker crane fingers of computer controlled stacker cranes which move back and forth between two rows of shipment-holding compartments and shift articles to and from holding compartments, transfer stations and the distribution conveyor.

The distribution conveyor is an endless continuously running conveyor loop located on top of the shipment-holding compartments. A magnetic belt coordinated with the distribution loop conveyor is used to record shipment-sorting instructions. A sorting instruction on a magnetic belt escorts each shipment while on the distribution conveyor to assist computer control of shipment disposition to another stacker crane for transfer to a compartment or another conveyor boom.

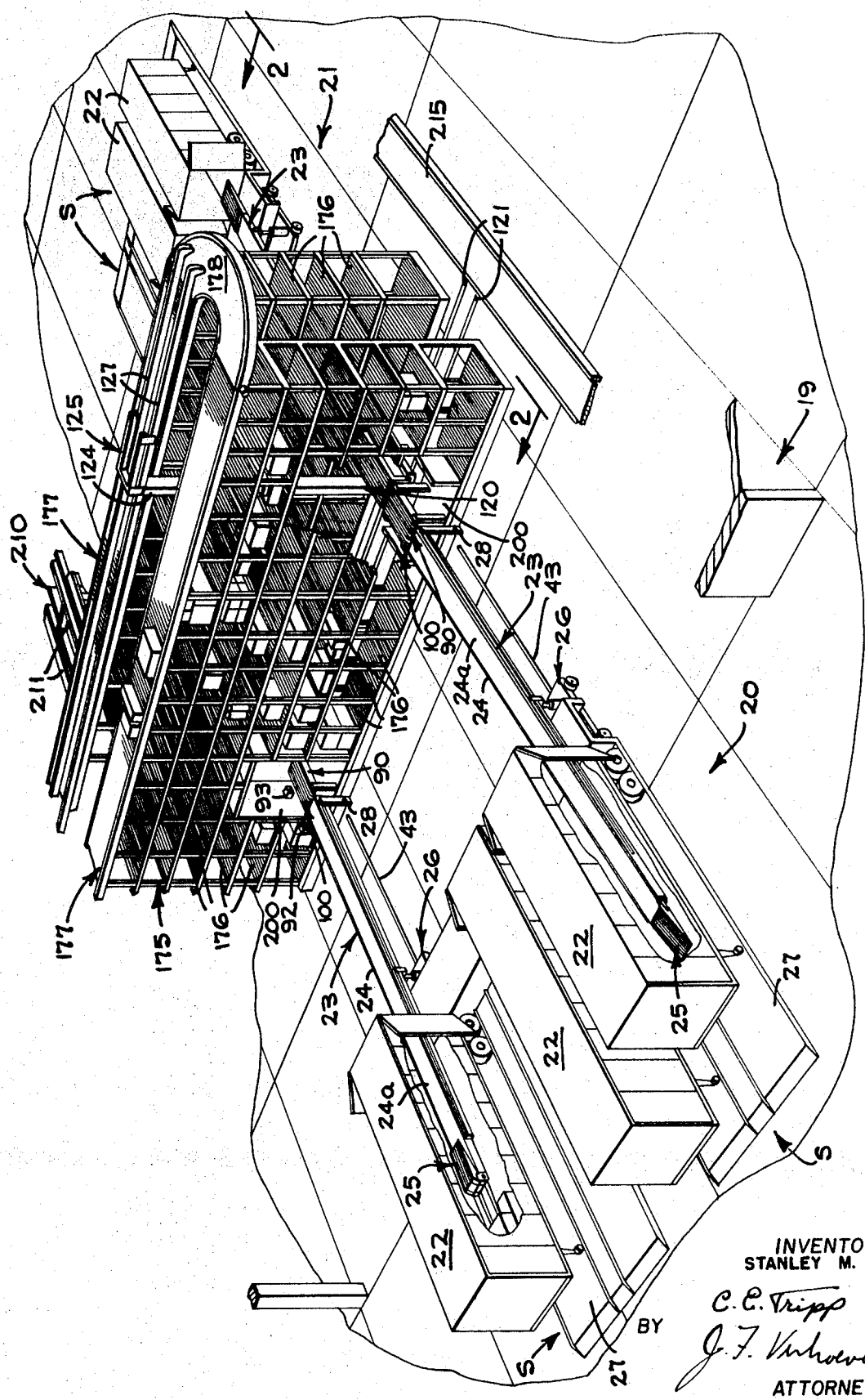

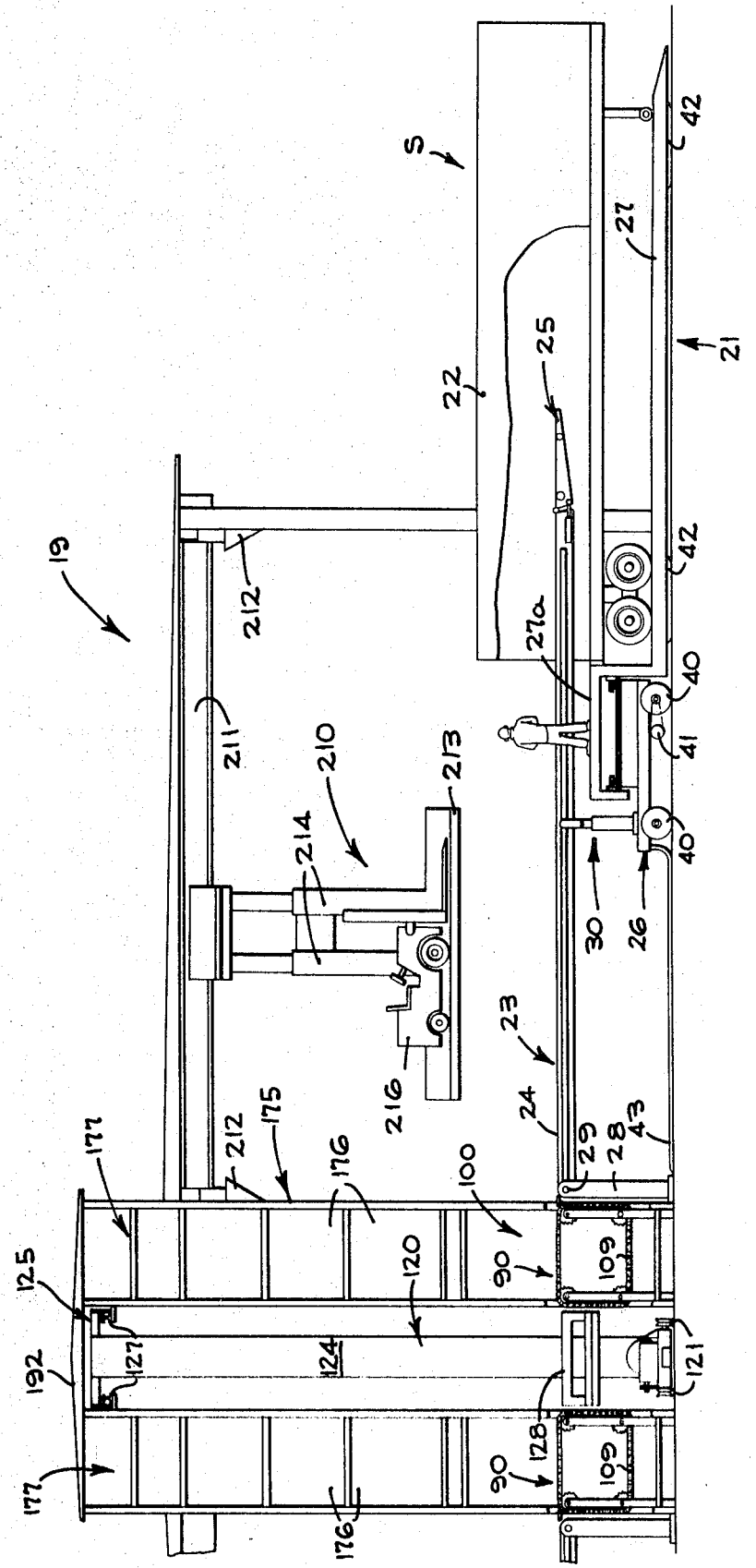

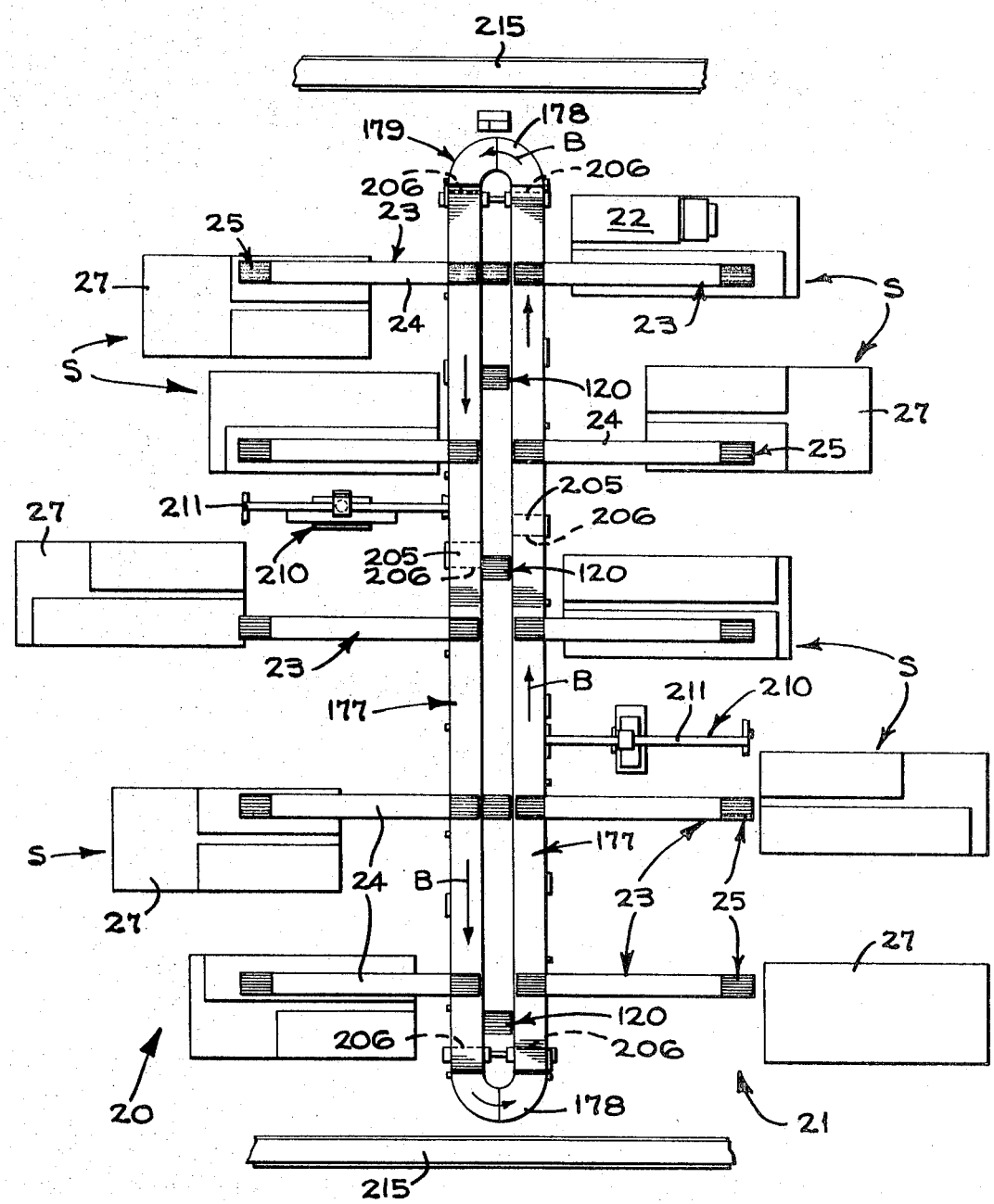
FIG_3

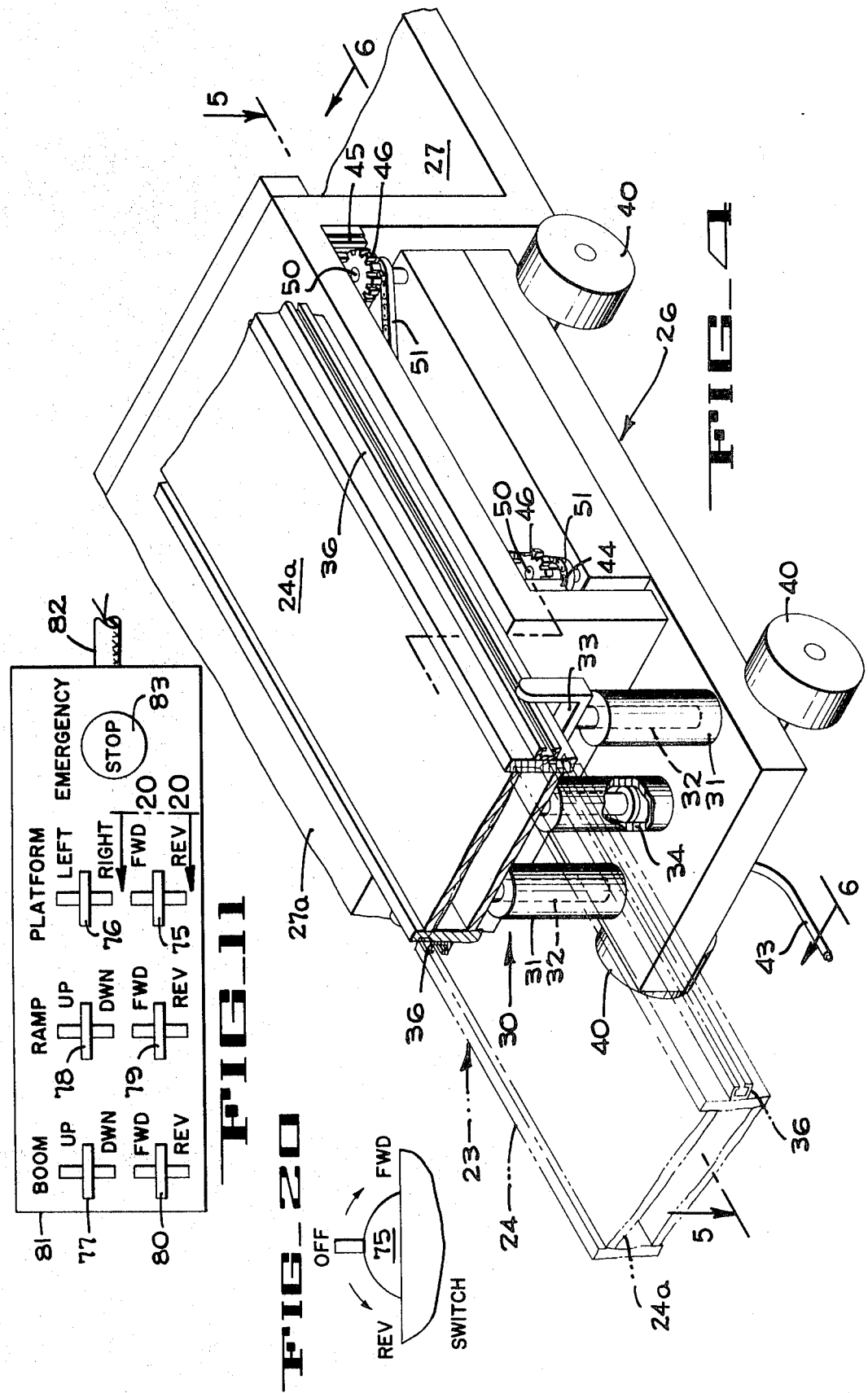

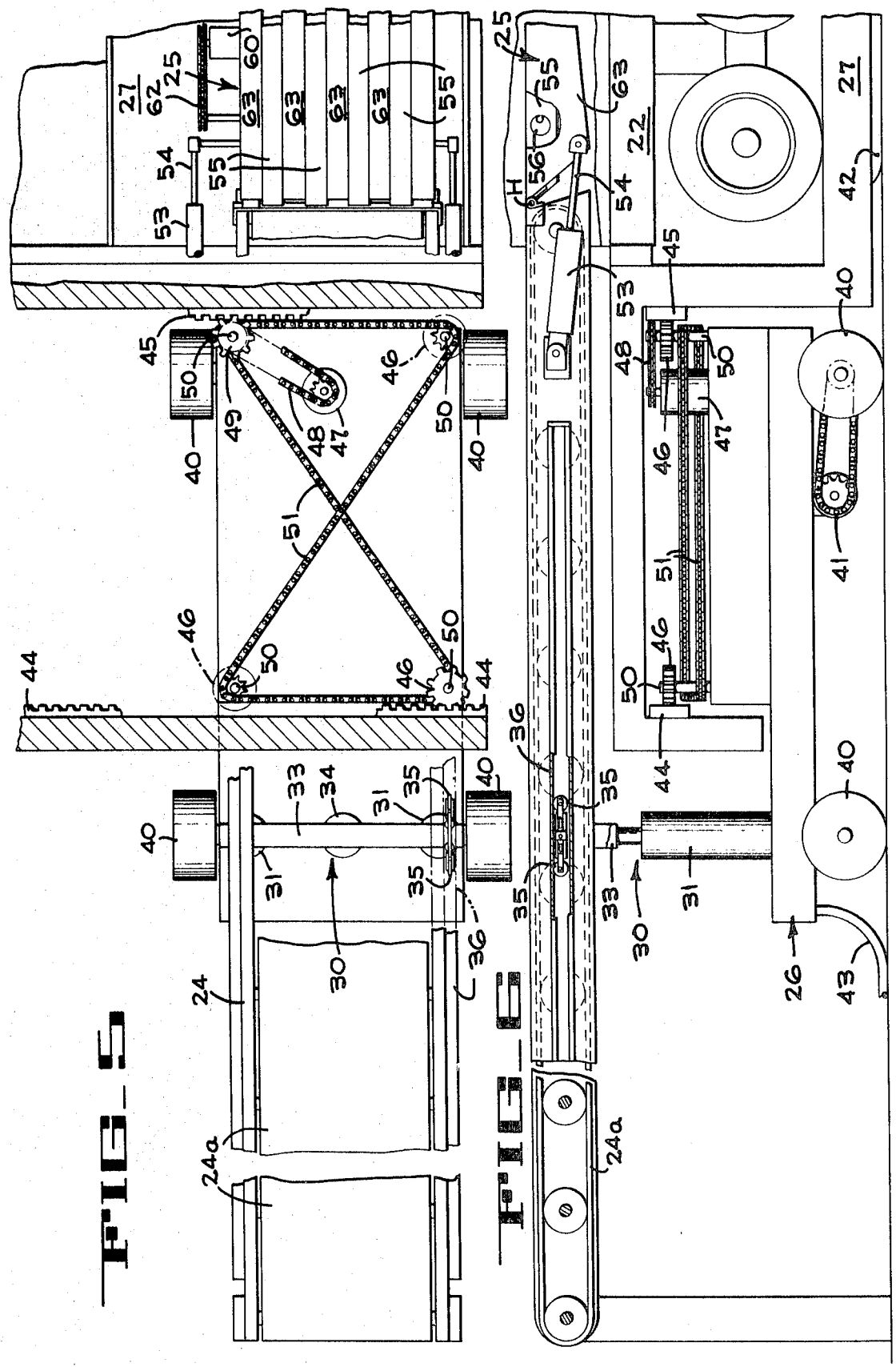

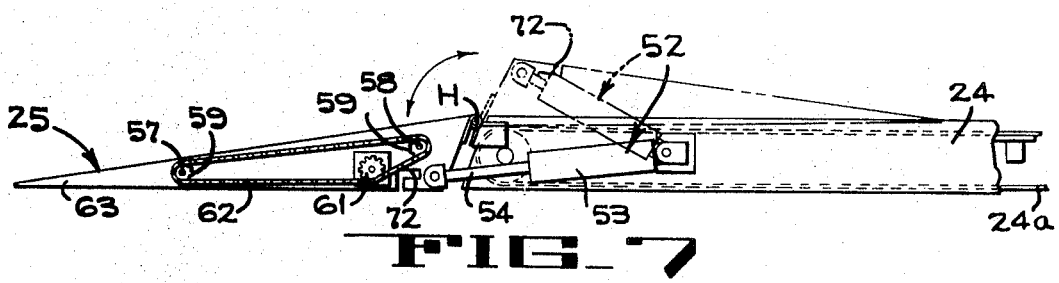
FIG_7
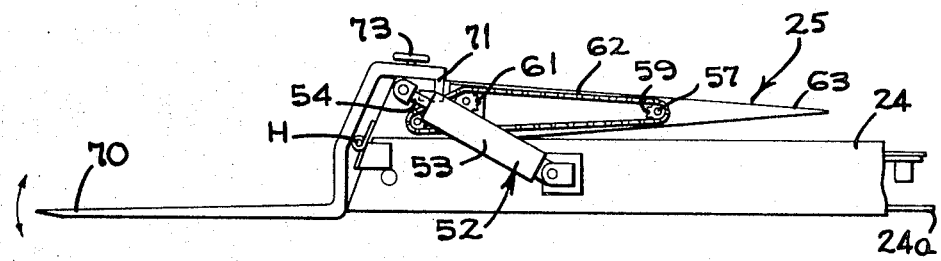
FIG_8
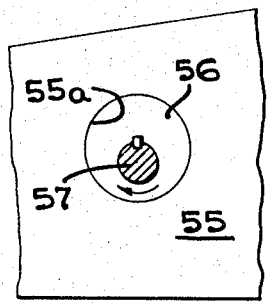
FIG_10
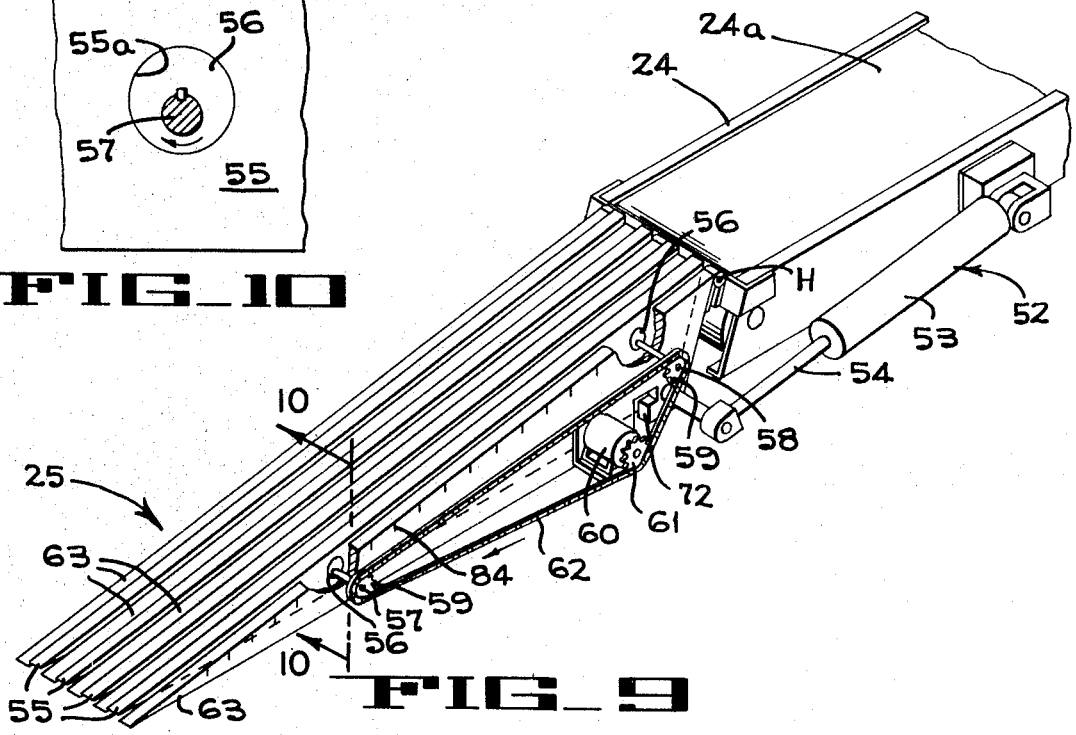
FIG_9

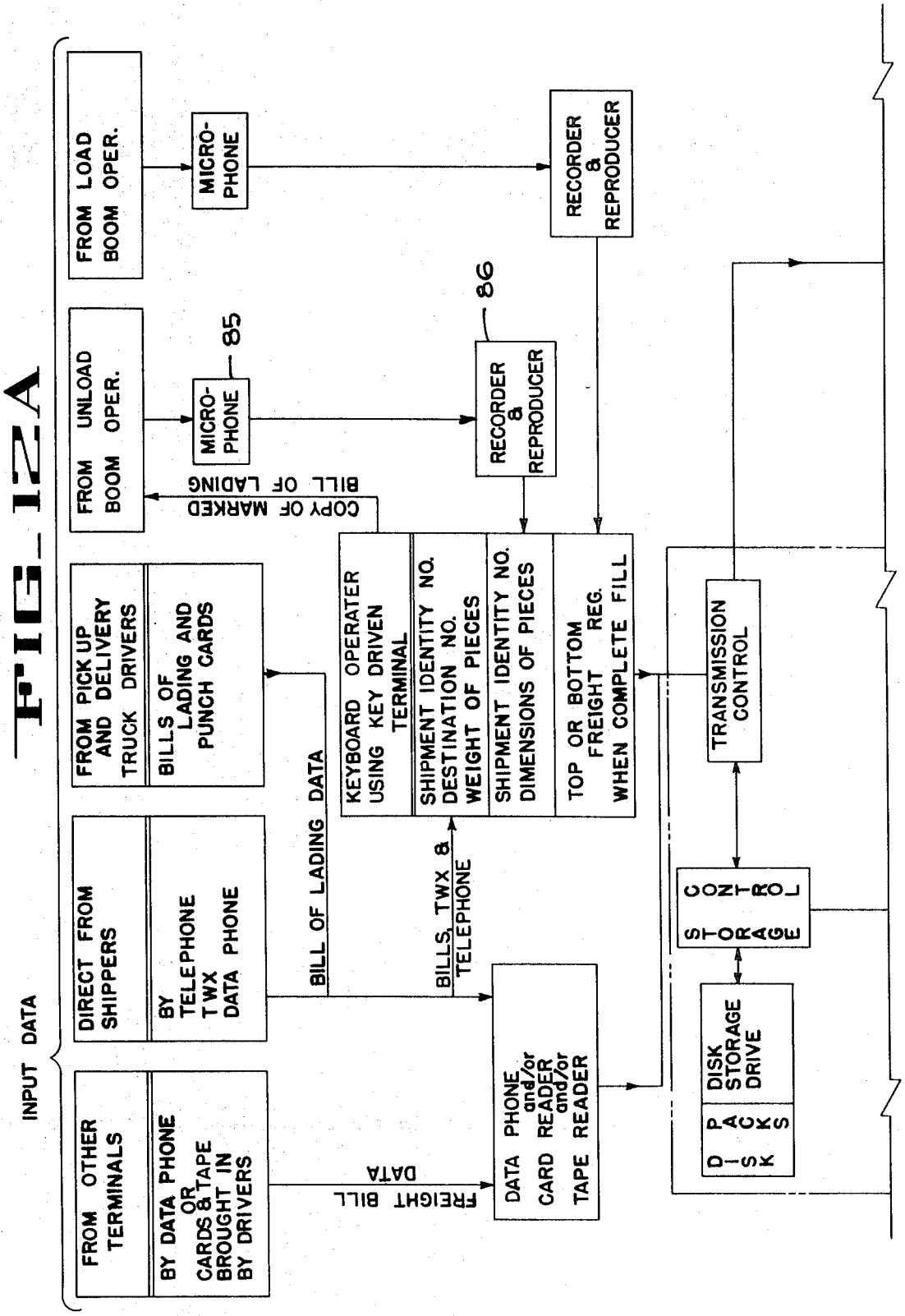
FIG_12A

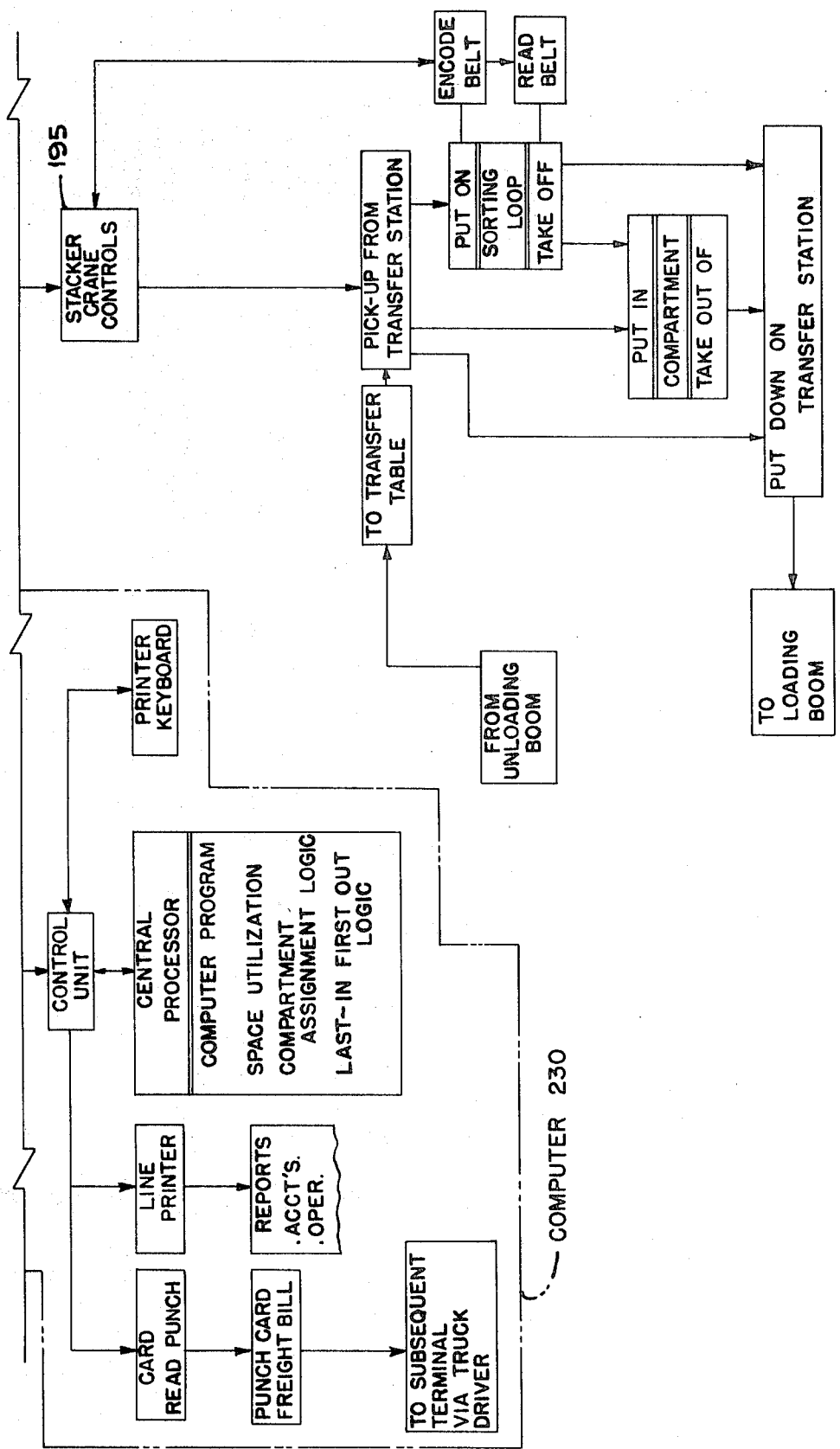
FIG_12B

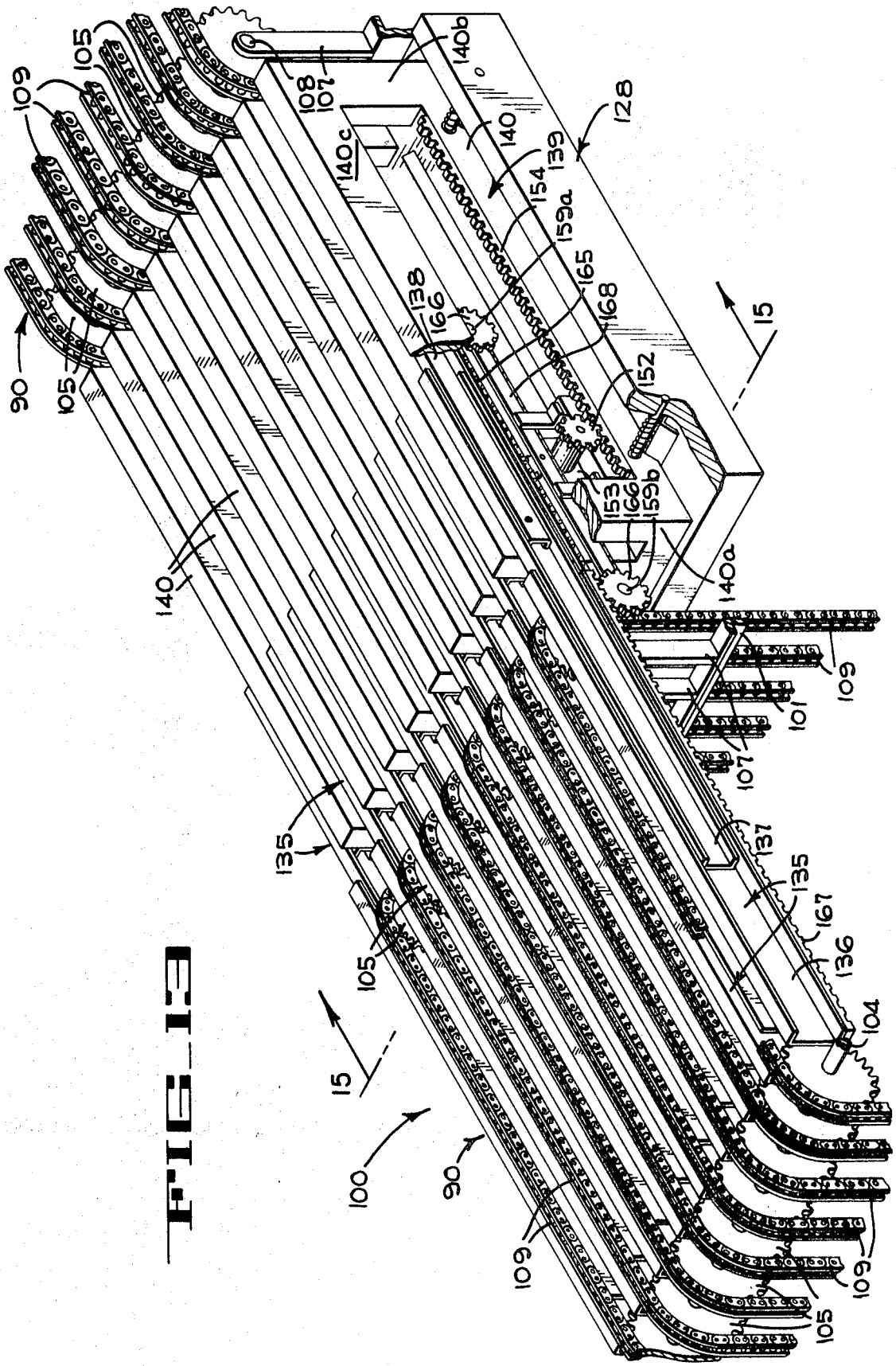

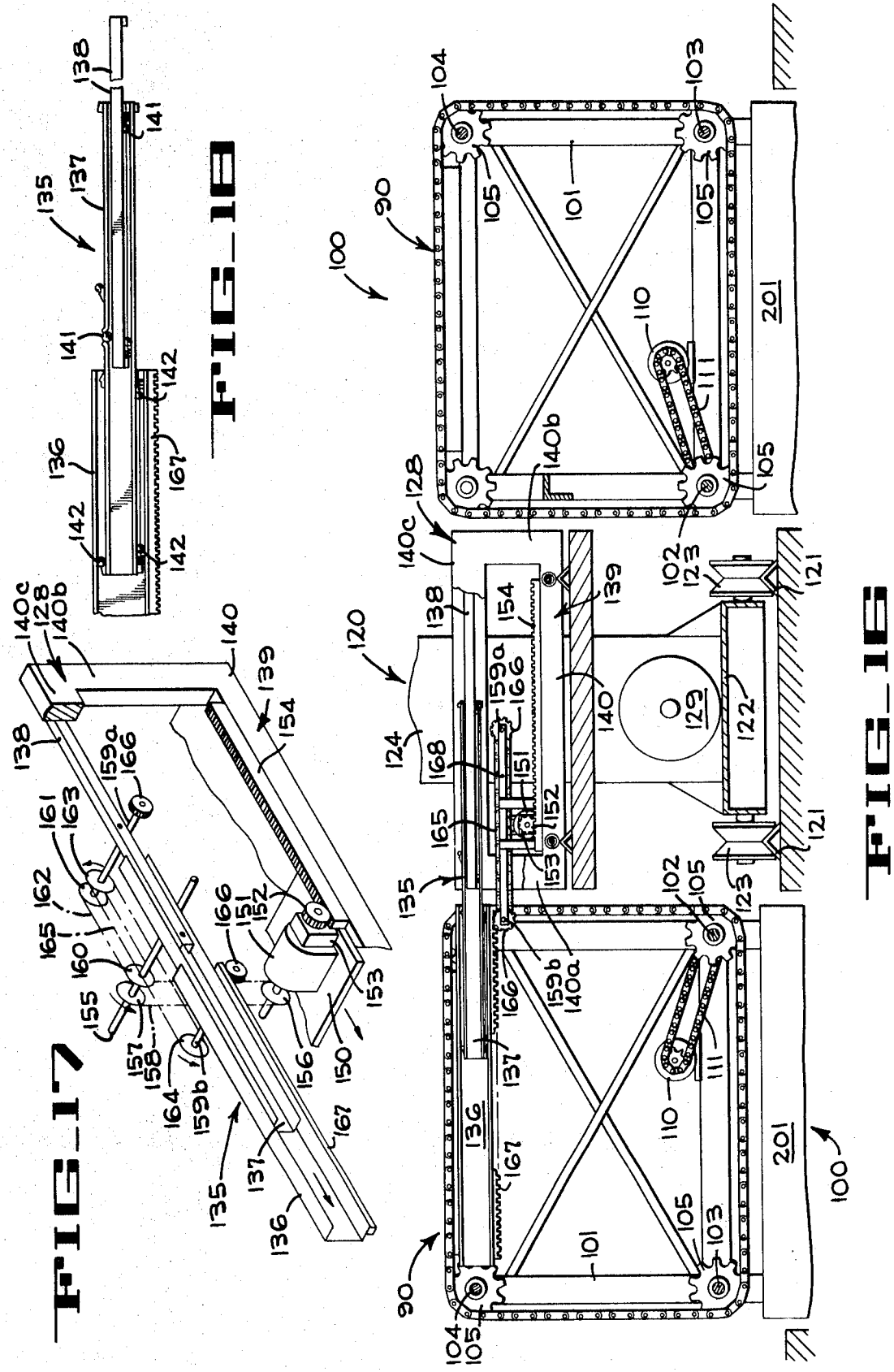

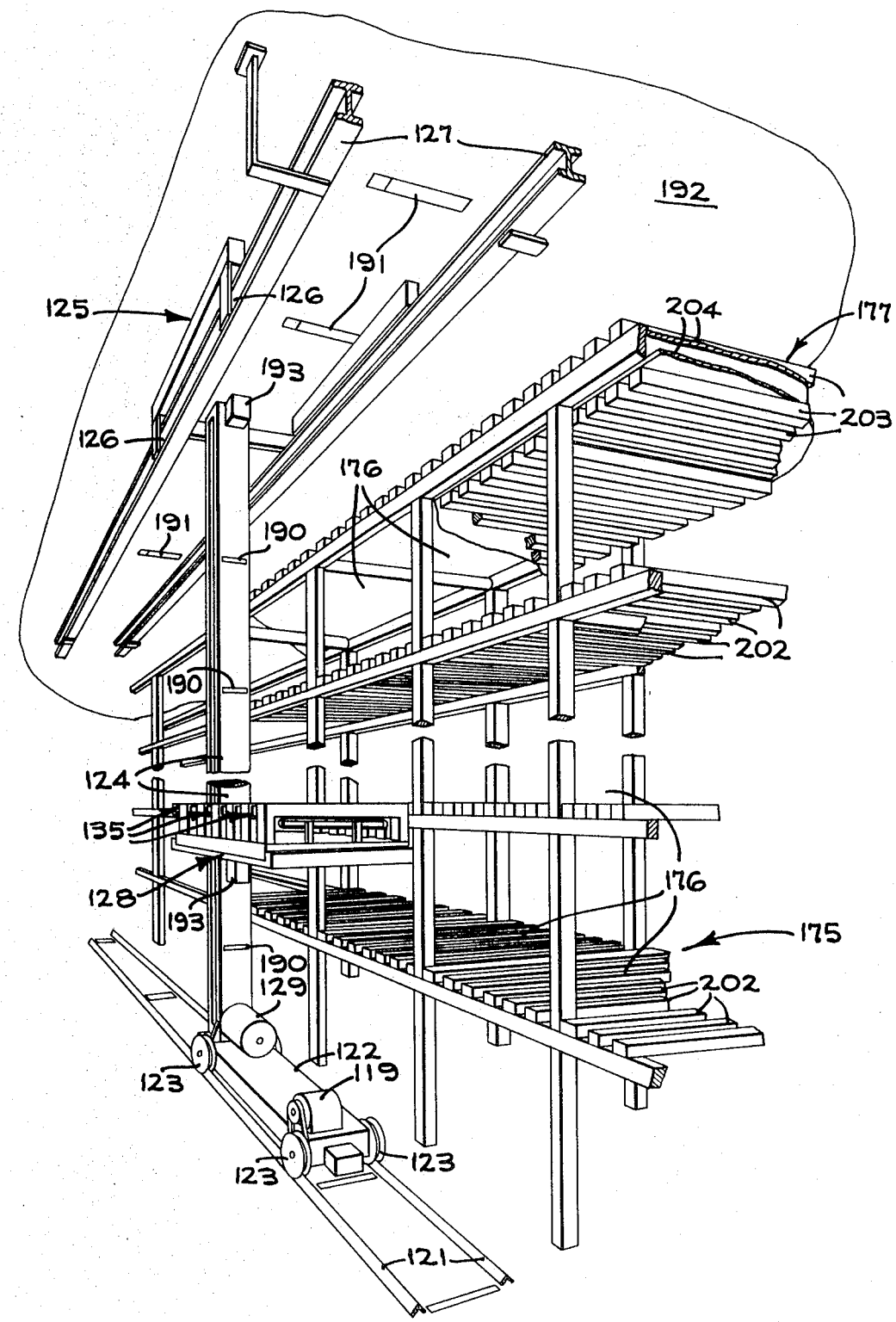
FIG_19

WAREHOUSE SYSTEM WITH INFEED AND DISTRIBUTING CONVEYORS SERVING STACKER CRANES IN A COMMON AISLE

BACKGROUND OF THE INVENTION

The present invention relates to an automatic terminal for loading, unloading and moving shipments from one freight container to another.

The freight terminal of the present invention is primarily illustrated by the disclosure of a truck terminal, but other terminals such as air cargo, rail terminals, or a combination of these could also be constructed in accordance with the present invention.

At a truck terminal, LTL (less than truck load) shipments are transferred from local pickup and delivery (P & D) trucks to long haul trailers bound for other terminals and from long haul trailers to local P & D trucks. LTL shipments are also transferred from one long haul trailer to another. Thus the primary function of a truck terminal is to unload shipments from incoming trucks, distribute the shipment according to destination or consignee address, and load shipments into other trucks or trailers bound for those destinations.

Some shipments may be unloaded from one truck or trailer and be moved directly to the appropriate truck or trailer for immediate loadout. However, other shipments need to be temporarily held back before being loaded out to permit staging of shipments to enable:

1. Stowage of heavy freight pieces on the bottom, light pieces on top to obtain favorable container-packing arrangements;
2. Loading shipments in last-in first-out delivery sequence;
3. Sorting and accumulating of shipments bound for the same destination so that all shipments for a given destination e.g., city, consignee) may be grouped together when loaded in and loaded out of a trailer; and
4. Accumulate sufficient shipments for a given destination to fill a container.

Reasons for performing these functions include reducing need for subsequent handlings, reducing travel distance between delivery stops, efficient utilization of container capacities, and minimizing damage to freight.

In a typical conventional terminal, articles are manually unloaded from inbound trucks onto pushcarts. If an article is too heavy to manually lift, fork-trucks are used. Loaded carts are manually pushed to the appropriate terminal door for loadout or, where towlines are installed for transporting carts, cats are manually hooked onto and removed from the towline.

Some problems associated with unloading and loading trucks using carts are:

1. Carts sometimes cannot be positioned near article pickup and putdown points because large, long and/or heavy articles are on the floor. Dockmen must therefore carry articles across large heavy pieces to and from pushcarts to clear out topoff freight before a fork-truck can get in and move big articles out of the way;
2. A fork-truck is not always handy when needed to move a large or heavy piece and a dockman may need to wait until one arrives before resuming load or unload operations;
3. To achieve economical use of carts it is often desirable to place two or more small shipments bound for the same destination on the same cart. To accomplish this, the dockman must look through freight to find, if possible, articles bound for the same destination; otherwise many carts may be used up transporting one or two small articles from one terminal door to another;
4. Articles comprising a shipment may be widely separated inside a trailer when loaded. This may be purposefully done to obtain an efficient packing arrangement of light articles on top, heavy on bottom. Also some shipments consisting of many articles or large size articles are loaded onto two or more carts and these carts separated from one another when moving from one terminal door to another. Therefore, shipments must normally be both checked in and checked out; checked in to be sure that all articles in a shipment were actually received, and checked out to be sure that articles of a shipment that have become separated are recombined for ship out;
5. A sizable portion of freight must be sorted out and arranged in last-in first-out order before loadout can begin; and
6. Considerable logic is required to size up freight weight, size and destination configurations to efficiently pack it in trailer space available.

SUMMARY OF THE INVENTION

To reduce cost and speed up handling of freight, the present invention provides loading-unloading conveyor booms which are integrally combined with a highly flexible automatic shipment apparatus. This apparatus, in turn, is combined with a commercially available computer for digesting the large amount of pertinent data, quickly evaluating alternatives, and directing the apparatus to effect the most favorable operating plan. Carts are eliminated; pallets are not needed; and conveyors in the conventional form are largely eliminated.

It is therefore one object of the present invention to provide an automated freight terminal. It is another object of the present invention to provide a freight terminal which receives and distributes freight for storage and reshipment quickly and efficiently with minimum use of manual labor. It is yet another object of the present invention to provide a freight terminal in which freight is temporarily held and redistributed for most effective use of carrier space.

BRIEF DESCRIPTION OF THE DRAWINGS

FIG. 1 is a perspective view of the freight terminal of the present invention;
FIG. 2 is a view taken on the lines 2—2 of FIG. 1;
FIG. 3 is a top view of the apparatus of FIG. 1;
FIG. 4 is a view in perspective of the platform cart;
FIG. 5 is a view taken on the lines 5—5 of FIG. 4;
FIG. 6 is a view taken on the lines 6—6 of FIG. 4;
FIG. 7 is a side view of the boom conveyor ramp, showing the ramp extended for operation in solid lines and showing the ramp folded back in dotted lines,
FIG. 8 is a view taken as the view of FIG. 7, showing the use of removable tines in place of the ramp;
FIG. 9 is a view in perspective of the ramp;
FIG. 10 is a view taken on the lines 10—10 of FIG. 9;
FIG. 11 is a top view of the operator's control box;
FIGS. 12A and 12B are a diagrammatic chart showing the automatic operation of the freight terminal;
FIG. 13 is a fragmentary view in perspective, with parts broken away, of the stacker crane platform and the transfer table;
FIG. 16 is an end view of the apparatus of FIG. 13;
FIG. 17 is a schematic representation of the stacker crane platform finger operating mechanism;
FIG. 18 is a side view of a stacker crane platform finger;
and
FIG. 19 is a view in perspective of a stacker crane and a storage rack.
FIG. 20 is a view taken on the line 20—20 of FIG. 11.

DESCRIPTION OF THE PREFERRED EMBODIMENTS

Figure 15:
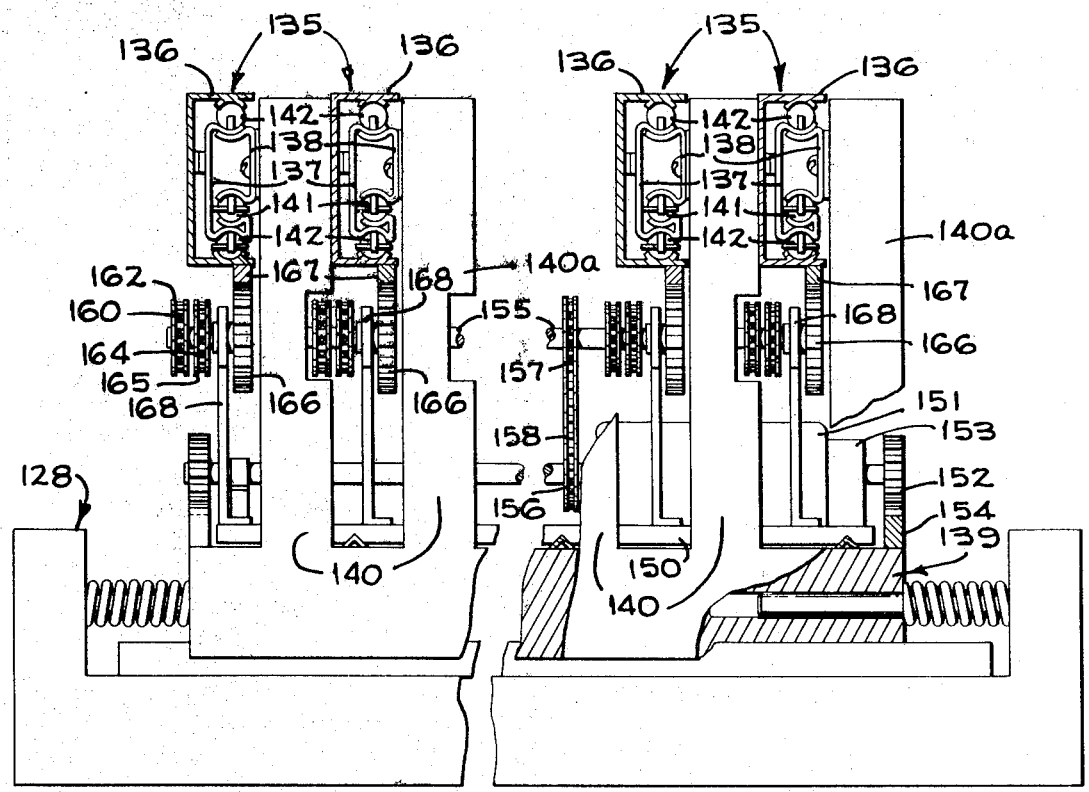
FIG. 15 is a view taken on the line 15—15 of FIG. 13.

In the present invention there is provided a terminal which is substantially automated to decrease the cost of operation thereof and/or to reduce time required to handle freight at terminals. In the preferred form of the invention, two rows 20,21 of loading-unloading stations, or zones, S are arranged on opposite sides of the terminal to receive in each row either inbound or outbound trucks and trailers 22, as shown in FIG. 1.

Leading to each loading-unloading station is a loading-unloading arm, as shown best in FIG. 2. In the preferred form of the invention, the loading-unloading arm 23 consists of four major parts: a fixed length conveyor boom 24, a ramp 25, a motorized cart 26, and a platform 27. The fixed length conveyor boom 24, which has an endless belt 24a (FIG. 9) to carry articles in one direction or the other thereon, is pivotally mounted at one end to a standard 28 so that it may be tilted up or down about pivot axis 29. The conveyor boom 24 is slidably attached to supporting structure 30 (see FIGS. 4, 5, and 6) which is mounted on carriage 26. The supporting structure 30 has two guide cylinders 31 into each of which a guide plunger 32 is slidably received. The guide plungers 32 are connected by a cross bar 33 which is raised and lowered by a pneumatic ram 34. The guide plungers 32 have rollers 35 connected thereto which are received in the track 36 of the conveyor boom. Actuation of the ram in one direction will raise the outer end of the arm 23 and actuation of the ram in the opposite direction will lower the outer end of the arm.

The cart 26 has wheels 40, one of which is driven by reversible motor 41 in one direction or the other to move the platform 27 in or out, depending on the direction of drive of the motor. The platform 27 is supported by air bearings or cushions 42 (such as Cell No. S1–4266 manufactured by Airfloat of Decatur, Ill.). The air bearings or cushions 42 are supplied with air under pressure by air line 43.

The truck trailer 22 is supported by the platform 27 which has an elevated end 27a for the operator to stand on during loading or unloading of the trailer. Connected to the platform under the elevated end 27a are two racks 44 and 45 which are engaged by pinions 46 mounted on cart 26. The pinions 46 are driven by motor 47 which is connected by drive chain 48 to a drive pinion 49 on a shaft 50. A second drive chain 51 connects all the pinions 46, which are mounted on shafts 50 journaled at each corner of the cart. It will be noted that drive chain 51 is crossed so that two of the pinions 46 are driven clockwise and two driven counterclockwise. Thus, he pinions, two of which engage the rack on one side and two of which engage the rack on the opposite side, shift the platform laterally in one direction or the other when the motor 47 is driven in one direction or the other.

A short wedge-shaped ramp 25, as shown best in FIGS. 7, 8, and 9, is connected on pivot axis H to the outer end of the conveyor boom 24. A power ram 52 has a cylinder 53 pivotally connected at one end to conveyor 24. The piston rod 54 of the ram is pivotally connected to ramp 25 below the pivot axis H thereof so that when the arm is extended the ramp is raised. As the ramp swings up and rod 54 crosses the pivot axis, ram 52 may be retracted to swing the ramp into a raised inoperable position, shown in dotted lines in FIG. 7. The ramp 25 uses a "walking beam" principle for conveying objects on its upper surface. The "walking beam" principle used by the ramp calls for a set of mobile wedge-shaped fingers 55 which are raised and lowered by circular cams 56. The cams 56 are eccentrically secured on shafts 57 and 58 which are journaled in fixed fingers 63. The cams 56 are rotatably received in circular holes 55a in the mobile fingers 55. As shown in FIG. 9, shafts 57 and 58 receive sprockets 59 thereon. Reversible motor 60 has a drive sprocket 61 which is connected by chain 62 to sprockets 59 to rotate shafts 57, 58. The mobile fingers 55 are interspersed with the stationary fingers 63 so that as the mobile fingers orbit about shafts 57, 58, 48, the mobile fingers rise above, and sink below, the top of the stationary fingers. When motor 60 is driven in one direction, the mobile fingers 55 move in one direction when above the stationary fingers to move the cargo in that direction. As the orbiting fingers change direction, they drop below the stationary fingers on which the cargo is deposited. As the orbiting fingers again rise above the stationary fingers, they again advance the cargo another incremental distance in the same direction. When the motor 60 is driven in the reverse direction the mobile fingers 55 will move in the opposite direction when above the stationary fingers 56 to move the cargo in incremental steps in the opposite direction.

When the ramp 25 is folded back as shown in FIG. 8, removable tines 70 may be mounted on the ramp. The hooked inner end 71 of the tines fits into a notch 72 in the ramp. A threaded clamp member 73 received in the tines screws down on the ramp to clamp the tines to the wedge.

The controls for loading-unloading arms 23 consist of a set of six switches 75, 76, 77, 78, 79 and 80 held in a small housing 81 that is attached to the belt of the operator. An extendable cord 82 connects the control housing to the load unload arm. Each switch has three positions: the upright, or central, position (in which the switches are shown in FIG. 11) where the switch is OFF, and the extreme position in either direction from the stop position where the switch activates the forward-reverse or up-down motions of the arm 23, platform 27, and/or ramp 25. One switch 75 controls the stop, or forward or reverse, motions of the motor 41 that powers the motorized cart 26 to move the platforms in or out. A second switch 76 controls the motor 47 that powers the sideways motion of the platforms. When these switches are on, air is simultaneously supplied to the platform air bearings 42. A third switch 77 controls the ram 34 that lifts or lowers the boom-conveyor. A fourth switch 78 controls the power ram 53 that tilts the ramp up or down. A fifth switch 79 controls the motor 60 which causes oscillation of the ramp conveying fingers 55. The sixth switch 80 controls the motor (not shown) which drives the belt 24a on the boom-conveyor. For safety reasons, an emergency stop button 83 may also be incorporated in the control housing.

When an inbound trailer 22 or P & D truck arrives and is parked on a platform 27, an for the loading-unloading manipulates controls for the loading-unloading arms 23 to scoop articles onto he ramp 25 or position the ramp so that articles may be manually slid or placed on it. To pick up a specific article in the trailer, the platform 27 can be shifted laterally to align the article with the ramp 25, and the boom 24 and ramp 25 can be vertically adjusted to position the ramp in front of the article and on the floor of the trailer. The platform 27 can then be advanced to bring the article to a position where the ramp fingers 55 will move the article up the ramp and onto the conveyor belt.

The loading arm operator loads all articles comprising a shipment together on the ramp 25 similar to the present practice of loading all articles in a shipment on a cart. Articles may be manually stacked on top of one another on the ramp.

After a loading-unloading operator has loaded the ramp and checked in a shipment, he uses a throat or headset microphone 85 (FIG. 12A) to tell pertinent information about the shipment including shipment number, destination number, identity number and dimensions. The ramp is scaled off along its sides, as indicated at 84 in FIG. 9, so that space occupied by the shipment on its surface can be readily read off. In addition a tape rule is used to determined height of the shipment. These dimensions are used to approximate the cubic space occupied by the shipment. Spoken works of the loading-unloading boom operator are recorded by a recorder and reproducer 86 which is played back by a keyboard operator who converts voice recorded information into computer input machine language. One keyboard operator may handle voice inputs from several loading-unloading boom operators.

When a loading-unloading boom operator has completed loading and checking in a shipment ion the ramp, he pushes the two switches 79, 80 controlling the conveying motions of the ramp and boom conveyor so that they convey the shipment toward a transfer table 90 where the shipment will be picked up by a stacker crane 120. Two electric eye sensors 92, 93, one located near the pivot end of the boom conveyor 23 and one located at the end of the transfer table near the stacker crane, control the feeding of shipments onto the transfer table and buffer storing them on the boom conveyor. When he sensor beam of electric eye 92 is broken by the presence of a shipment near the pivot end of the boom conveyor, the conveyor stops, provided that the beam from electric eye 93 at the stacker crane end of the transfer table is also blocked, indicating the presence of a shipment on the transfer table. Otherwise, if the transfer table sensor beam for electric eye 93 is not blocked, the boom conveyor 23 feeds the shipment onto the transfer table where it moves forward until the transfer table beam from electric eye 93, causing the transfer table conveyor to stop.

Figure 14:
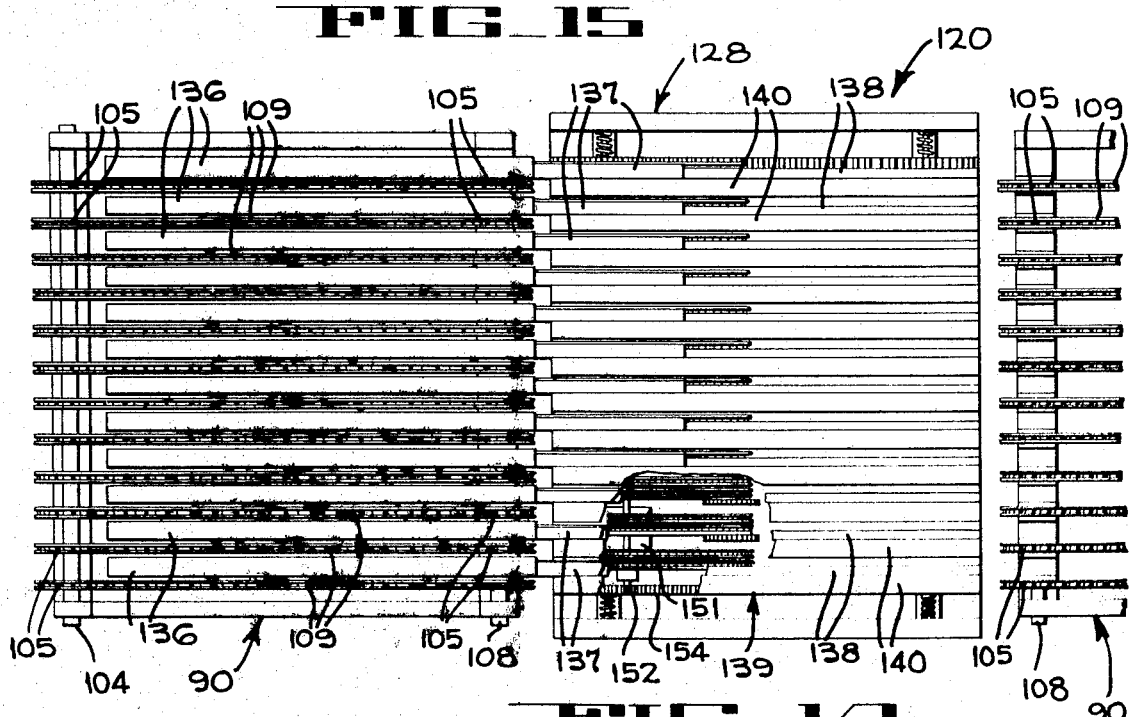
FIG. 14 is a top plan view of the apparatus shown in FIG. 13.

The transfer tables, which are located at a transfer station, or zone, 100, have a frame 101 (FIGS. 13 to 18) in which shafts 102, 103 and 104 are journaled at the lower inner and lower outer corners and at the upper outer corner, respectively. The shafts 102, 103, and 104, respectively, have spaced sprockets 105 mounted thereon. The inner side of the frame has spaced upstanding legs 107 in each of which a stub shaft 108 is journaled. Sprockets 105 are mounted on each of the stub shafts in spaced apart relation, each lying in a plane of one of the sprockets on each of the shafts 102, 103 and 104. An endless chain 109 is received on each set of four sprockets 105 lying in a plane so that the endless chains 109 encircle the frame in parallel planes in spaced relation. All the chains on each frame 101 are driven in unison by a motor 110 connected to shaft 102 through chain 111.

The transfer stations 100, and the tables 90 therein, are positioned in straight lines, one line for the loading-unloading stations S on one side of the terminal and another line, closely spaced and parallel to the one line, for the loading-unloading station S on the other side of the terminal. In the space between the two lines, which is just wide enough to accommodate a stacker crane, a plurality of stacker cranes 120 are received in end to end relation, each movable on rails 121 between adjacent cranes and between opposite transfer tables.

Each stacker crane 120 (FIG. 19) has a base 122 with wheels 123 mounted thereon to ride the rails 121. The stacker crane is driven on the rails in one direction or the other by the reversible motor 119 mounted on platform 122. Rising from the base is a standard 124 which is connected to an overhead trolley 125 with wheels 126 to ride on the overhead rails 127. A platform 128 rides vertically on the standard and is raised by motor 129 through a chain (not shown). The platform 128 has a set of fingers 135 which, when the stacker crane is between opposing transfer tables, can be extended in spaced relation from either side into intermeshing relationship with the spaced chains 109 on the transfer tables.

As shown in FIGS. 13 to 18, inclusive, the fingers, indicated generally as 135, comprise an outer channel 136, an intermediate channel 137, and an innner channel 138. The platform 128 has a slide 139 with a plurality of upstanding rectangular frame members 140 each having vertical side members 140a, 140b, and a horizontal upper member 140c. The inner channel 138 of each finger is secured to the upper horizontal member 140c, as shown in FIG. 17, and the intermediate channel 137 rides on balls 141 (FIG. 18) which are received between the inner and intermediate channels. The outer channel 136 rides on balls 142 which are received between the intermediate and outer channels. Thus, the outer channel and intermediate channels are mounted in telescopic relation on the inner channel, in the same manner as shown, for example, in the U.S. Pat. No. 2,606,090.

A slide 150 (see FIG. 17), which is mounted for lateral movement on the slide 139, carries a motor 151. Motor 151 is connected to a pinion 152 through gear box 153. The pinion 152 is engaged with a rack 154 secured to slide 139. The motor 151 is also connected to a shaft 155 through sprockets 156, 157 and chain 158. A first countershaft 159a is connected to shaft 155 by means of sprockets 160, 161 and chain 162. A second countershaft 159b is connected to the first countershaft by means of sprockets 163, 164 and chain 165. The two countershafts each have a pinion 166 aligned with each finger 135 to engage a rack 167 on the lower edge thereof.

When the fingers are extended to one side, such as the left side as viewed in FIGS. 16 and 17, the slide 150 (and the motor 151 thereon) are in the extreme left hand position. At this time, the fingers are received in intermeshing relationship with the chains 109 on transfer table 90. The platform 128 can then be raised or lowered to pick up articles from, or deposit articles on the transfer table 90. When it is desired to pick up or deposit an article on a transfer table on the other side, the motor 151 is energized to initiate movement of slide 150 to the right. The energization of motor 151 rotates the countershafts, which are journaled in supports 168 mounted on slide 150. The rotation of the countershafts rotates pinions 166. Thus, slide 150 moves to the right, as does the outer finger channel 136 and the intermediate finger channel 137. As the slide 150 moves to the right, the rack 167 on the outer channel engages the right-hand pinion 166 and extends to the right. When the fingers are in the extreme right-hand position and the fingers will be in intermeshing relationship with the chains 109 of the right-hand transfer table. When the slide 150 is centered, the fingers will be disengaged from both transfer tables.

As shown in FIGS. 1, 2, and 19, a storage rack 175 having storage compartments 176 therein, extends parallel to tracks 121, 127 on each side thereof between the stacker cranes 120 and the inner ends of the boom conveyors 23 (see FIG. 2). A conveyor 177 is mounted on top of each rack, and the conveyors 177 are connected at each end by semicircular conveyors 178 to define an endless distribution conveyor loop 179 around the path of the stacker cranes 120.

The control system for operation of the stacker cranes 120 includes magnetic code bars 190 (FIG. 19), one for each horizontal row of storage bins in the rack, mounted on the side of the stacker crane standard 124. A set of similar magnetic code bars 191, one for each vertical column of storage bins in the rack, is mounted on the ceiling 192 of the building 21 directly over the stacker cranes. Each stacker crane has two code readers 193, 194, one (193) mounted on the crane platform 128 to sense the code bars 190 mounted on the stacker crane standard, and one (194) mounted at the top of the stacker crane standard to sense the code bars 191 mounted on the ceiling. The readers are a part of the stacker crane controls 195 (FIG. 12B) and give the instantaneous longitudinal position of the stacker crane (reader 194) and the instantaneous vertical position of the platform 128 (reader 193). Control signals for the operation of the stacker crane motors, to move the stacker crane platform to desired longitudinal and vertical positions, are fed to the control unit from a computer.

The transfer station 100 is located in openings 200 (see FIG. 1) in the racks at the inner end of each boom 23. The extendable fingers 135 of the stacker crane platform mesh with the chains 109 in the transfer station, and the stacker crane platform can be moved up or down to lift cargo off the transfer station chain fingers or deposit cargo on said fingers. Alternately, the retraction of the crane fingers can be synchronized with the speed of the chains 109 in the transfer station to convey a load from the transfer station to the retracting crane fingers. This latter approach would be used when very heavy pieces are moved so that the weight of an extremely heavy piece does not rest on crane fingers when they are in a cantilevered position.

Although the ratio of stacker cranes 120 to booms 23 (one to two in the form of the illustrated) at a given terminal may be well balanced from the standpoint of handling overall daily and peak hour volumes of shipments, there are likely to occur temporary imbalances among crane and boom shipment handling rates during shorter time intervals. For example, the rate at which an operator loads shipments on a boom may temporarily exceed the rate at which an associated stacker crane can dispose of them. Therefore the boom conveyor 23 is used as a buffer to temporarily store shipments when the rate at which crane and boom, working at their own independent paces, get out of balance. If two or more shipments must be buffered on the boom conveyor then the following procedure may be followed until the boom conveyor is filled with shipments; the operator holds down lever 80 causing the boom conveyor to bring shipments previously buffered on the boom toward the ramp until the most recently buffered shipment is moved back to a position next to the ramp which has been loaded with a shipment that is waiting to be moved onto the boom conveyor. The operator then pushes the boom conveyor control lever 80 in the opposite direction, causing the buffered shipments to again move in the reverse direction toward the transfer table. The shipment on the ramp moves off the ramp following at the rear of the lengthened column of buffered shipments. A space is left on the boom conveyor between buffered shipments so they may be identified one from the other by the "electric eye" 92. The operator can control this spacing by switch lever 79, which controls when the conveying surface of the ramp is activated for moving a shipment onto the boom conveyor. Buffered shipments automatically stop as they near the transfer table for pickup by a stacker crane. The buffer works the same, only in reverse, when shipments move from cranes into trucks and trailers for loading out.

A scale 201 (see FIG. 16) may be incorporated as part of each transfer station where shipments are transferred between the boom conveyor and the stacker crane. Shipments are automatically fed one at a time to transfer stations from either the boom conveyor or cranes. By incorporating a scale as part of a transfer station, weight of individual shipments or cumulative weight of shipments passing across a transfer station may be recorded.

Shipments picked up from transfer tables 90 by cranes 120 are moved either to another transfer table for immediate loading out, or to the racks 175 for temporary storage, or to the sort distribution conveyor 179 whenever distribution logic calls for routing shipments from one stacker crane to another.

A stacker crane moves horizontally in the aisle between the racks 175 and its platform 128 moves vertically. The mobile fingers 135 of the platform can reach right or left for pickup or deposit of shipments to/from transfer stations and storage compartments 176. Storage compartments may vary in size to accommodate various size shipments and pieces. Most storage compartments have parallel runners 202 (FIG. 19) between which stacker crane fingers may be meshed. This construction makes it possible to move most shipments in and out of storage compartments without palletizing them. The procedure for moving shipments without palletizing them is as follows: Shipments are picked up at transfer stations and moved to storage compartments. At a storage compartment, crane fingers reach in, meshing between runners 202, with the top of the fingers being slightly above the top of the runners. When pieces on the crane fingers have been moved in as far as desired, the fingers are lowered between runners, exchanging the load from fingers to runners. The crane fingers are then retracted. The procedure is reversed to that described above when transferring a load from runners to crane tines.

It should be noted that several shipments may be loaded in a storage compartment. For example, a number of small boxes bound for the same destination may be loaded in the same storage compartment by reaching in with crane fingers and placing early arrival boxes (that is, shipments) toward the back of a storage compartment and late arrivals toward the front. Compartment storage space is thereby more fully utilized and the number of trips necessary when loading out shipments from storage compartments to boom conveyors is reduced. Split shipments may also be consolidated in a compartment using this technique.

Since all the cranes 120 run on a single track, each crane can reach only a limited number of storage compartments and transfer stations. The sorter conveyor 179 is used whenever it is necessary to route a shipment from a transfer station in the range of one crane, to a transfer station in the range of another crane. The sorter conveyor, in combination with cranes, automatically sorts shipments from one transfer station 100 to another. The long conveyors 177 running along either side of the crane aisle have individual runners 203 fastened to them (see FIG. 19) in closely spaced relation so that shipments may be transferred from crane fingers to sorter conveyor runners. The sorter loop runs continuously in one direction (that is, either clockwise or counterclockwise) but is shown, for illustrative purposes, as running counterclockwise, as indicated by arrows B in FIG. 3. To transfer a shipment from crane 120 to sorter conveyor 179 and vice versa, the crane moves parallel at the same speed and direction as the sorter conveyor. The stacker crane moves in unison with the sorter conveyor while a shipment is transferred from crane to sorter or vice versa in the manner previously described for transferring shipments to and from the transfer table. The flexible belt 204 on which the conveyor runners 203 are mounted contains magnetic material embedded therein (as described in the Dec. 21, 1964 issue of PRODUCT ENGINEERING, page 52, and is commercially available from Cutler Hammer) which will receive and retain coded bits of data. At the time when a shipment is transferred to the sorter loop 179, a machine language escort code is recorded on the magnetic belt 204. This escort code on the belt moves along with (that is, escorts) the shipment as it moves along the sorting loop. Escort codes are keyed just following keying of an instruction to a crane to move a given shipment to the sorting loop. These escort codes supply a subsequent crane that picks a shipment off the sorting loop with instructions as to which rack slot or transfer table, in the second crane's zone of operation, a shipment is to be delivered.

Each crane has two shipment put-on pickoff stations, or zones, 205, one on either side of the sorting loop, as shown in FIG. 3. The cranes position themselves at these stations when commencing a sorting loop put-on or pickoff operation. Associated with each sorting loop put on/pick-off station, and mounted station, said station, is an escort code read/write device 206 for writing escort instructions on the magnetic belt when shipments are placed on the sorting loop and for reading out instructions from the magnetic belt when shipments are removed from it. Escort instructions are erased from the magnetic belt and new escort instructions encoded on the belt as shipments are puton and picked-off the sorting loop, as shown in FIG. 3. In addition, a device 206 is provided on which instructions are read at the downstream end of the upper run of each conveyor 177 and erased therefrom, and then transmitted to the upstream end of the upper run of the opposite conveyor 177. In this manner, the escort instructions follow the goods around loop 179. To insure that there is enough space on a sorting loop conveyor to permit the insertion of a shipment onto the belt by crane, escort code readout devices 206 monitor the distance on the magnetic belt between encoded escort codes. When the distance between codes is sufficient, a crane at a put-on station 205 is given the "go-ahead" signal to proceed with placing a shipment held by a crane onto the appropriate space on the sorting loop. Escort code readout devices may also be used to signal a stacker crane ahead of time when a shipment is to be picked off the sorting loop by the crane so that the crane knows which of its two puton/pickoff stations to report to for pickoff of a shipment from the sorting loop. Pickoff of shipments from the sorting loop may be used as fill-in work for cranes whenever there are no other instructions to carry out.

Very long (for example, pipe, rugs) and wide and heavy pieces are handled differently from the cargo handled on the stacker crane and sorting loop system described above. The telescoping-mast bridge cranes 210 are mounted on beams 211 for movement thereon. The beams 211 are mounted at each end on rails 212 for movement over the booms 23. THe cranes 210 have a platform 213 mounted at the end of telescoping masts 214. Thus, the platform can be moved universally in three directions. Articles oversized for handling by the computer controlled equipment are picked off loading-unloading arms by the bridge cranes 210 and put other loading-unloading on otherloading-unloading arms for immediate loadout, or are held in numbered floor holding areas for subsequent pickup and loadout. Instructions for handling oversized pieces are received by the bridge crane operator via walkie talkie from the terminal supervisor. There is one or more bridge cranes located on each side of the terminal and oversized pieces may be transferred from one side of the terminal to the other by conveyors 215 located at either end of the holding compartment rows or moved straight across via a loading-unloading arm on one side of the terminal to the loading-unloading arm directly opposite it on the other side of the terminal via associated transfer tables and stacker crane.

In some cases it may be necessary to use a fork-truck 216 to move articles. In such cases the bridge crane operator picks up a pallet-type platform on which a fork-truck is parked and moves into a position level with the upper portion of the appropriate loading-unloading arm platform. The oversized article is pulled out of the trailer and onto the bridge crane platform by the fork-truck and both fork-truck and article are moved to the desired putdown point.

Stacker cranes receive computer instructions each of which consists of a pickup location X-coordinate/Y-coordinate number and putdown X-coordinate/Y-coordinate number. Each holding compartment, transfer station and sorting loop pickup and putdown station has a unique X/Y coordinate number. Stacker cranes move shipments according to X/Y pickup and putdown instructions.

If a shipment is moved to the sorting loop, a second computer instruction is received by magnetic belt write head. This instruction consists of the number of the stacker crane that is to pick the shipment off the sorting loop and a X/Y coordinate putdown number which is either a compartment or transfer table location where the crane is to place the shipment. When the first crane places the shipment on the sorting loop, the write head writes the appropriate instruction on the magnetic belt 204. This instruction escorts the shipment as it travels around the loop. Magnetic code read heads 206 (two for each crane) stationed around the loop read magnetic instructions as they pass by and signal their associated cranes when to pick shipments off the sorting loop and where to put them down. After a shipment has been picked off the sorting loop, the escort code is erased so that the space on the magnetic belt can be used again for escorting another shipment.

Stacker cranes work on a priority basis which normally calls for executing the sorting loop pickoff instructions first. A manual override by the terminal supervisor permits the priorities to be changed.

As shown in FIGS. 12A and 12B, data regarding each shipment originating in the geographical region covered by a terminal may be input from several sources including P & D truck drivers, and direct from shippers and other terminals via telephone, TWX and data phone. Most common, however, is for P & D truck drivers to bring in shipper's bills of lading with them when they bring in shipments picked up.

Bills of lading are sent to keypunch operators who assign each shipment an identity number (which may be the same as the freight bill number) and a destination number. The destination number is the number of a terminal to which the shipment is to be sent for rehandling or the section of a city within the region covered by a terminal to which a shipment is to be delivered. This data then goes to a computer, and as soon as these numbers are received by the computer, unloading of P & D trucks may begin. The balance of data listed on bills of lading such as addresses of shipper, consignee and description of articles being shipped, which data is required for make up of freight bills, accounting and other purposes, may be keyed in by keypunch operators as time permits.

Copies of bills of lading are used by loading-unloading arm operators to check in shipments when unloading P & D trucks. After a shipment has been checked in, the loading-unloading boom conveyor operator calls out the shipment identity number and the dimensions of the shipment. Loading-unloading arm operators, when unloading shipments, notify the keypunch operator when an article is oversized or overweight for automatic handling. When loading shipments, loading-unloading arm operators notify the keypunch operator what type of freight (bottom, middle or top of density shipment) they want for loading, and when they have filled up a truck or trailer.

Scales 201 which are located under transfer tables, are used to verify bill of lading stated weights. Scales may output machine language weight readings directly to automatic data processing equipment.

The computer control processor (FIG. 12B), which may be located at the terminal or at a computer service center, operates according to programmed instructions. The computer program is based on scheduled departure times for the various destinations, space available in trucks and trailers that can be used to deliver shipments to the various destinations, last-in, first-out logic, door assignment logic and holding compartment assignment logic. Door assignment logic refers to the sequence in which the various inbound and outbound trucks and trailers should be spotted at loading-unloading arm positions or doors. Compartment assignment logic refers to the logic used for arranging shipments in compartments which in general calls for shipments bound for the same destination to be grouped together in adjacent compartments as nearly as possible to the door position where they are to be loaded out. Last-in first-out logic is based on the distance and direction of delivery stops from a terminal and the volume of freight to be delivered to each stop. The computer is informed of the sequence in which shipments are received by loading-unloading arms, the destination, dimensions and weight of each shipment. Based on programmed logic it produces:

1. Stacker crane coordinate instructions
2. Sorting loop encoding instructions
3. Bridge crane instructions.

The computer remembers the location of every shipment held in compartments and the dimensions and weight of those shipments. It periodically scans this data in order to determine the most favorable sequence to have stacker cranes pull shipments out of compartments for loadout.

The computer also prints out freight bills and other operating and accounting reports. So that it is not necessary for keypunch operators to rekey data already keyed at the shipment originating terminal, the computer may prepare machine language punchcards for originating shipments or data may be encoded on tape. Data in the form of machine language cards or tape covering shipments hauled from one terminal to another may be carried by truck drivers or sent by data phone to the second terminal thereby permitting automatic rather than keypunch input of most data required for automatic shipment handling.

It will be noted from FIGS. 12A and 12B that input data, for the terminal system comes from many sources including other terminals, shippers, drivers, and boom operators. Most of this data input is fed to a keypunch operator who transforms it into machine readable data which can be supplied to a computer. All pertinent information regarding the good on hand is stored in the computer for use when needed. THe data is handled by the computer according to predetermined programs. FOr example, the computer will select the best compartment for storage of incoming goods, taking into account the location of the incoming trailer, the location of the trailer on which it is to be loaded, and the availability of empty, or partially filled, compartments. The computer is also programmed to deliver articles to the outgoing trailer in a sequence such that first articles placed in the trailer will be the articles to be unloaded last and the last articles loaded will be the first articles to be unloaded. The computer also determines the best distribution of the freight among available trailers going to a given destination to get maximum utilization of the trailers within the space and weight capacity of each.

The stacker cranes are controlled through the computer to pick up incoming goods at a transfer station 100 or deposit outgoing goods at a transfer station, and to deposit goods in, or take goods from, a compartment 176. The stacker cranes also deposit goods on, and take goods from, the distribution conveyor 179 and, at the same time, incodes and erases the magnetic belt 204 of the conveyor.

In operation of the freight handling terminal, trailers to be unloaded are parked on a platform 27 on either side of the terminal. An operator, by controlling the movement of the platform 27 and the conveyor boom 23, unloads the trailer. The goods are moved on boom 23 to transfer station 100, where they are transferred to a stacker crane 120. Before the goods are picked up by the stacker crane, however, detail data on the shipment is fed to the computer 230 to ascertain the disposition of the shipment in the freight terminal. Under instructions from the computer 230, the stacker crane can either 1. take the goods from the transfer table 90 and transfer them to the opposite table 90 for immediate transfer to a boom conveyor 23 and loading on an outgoing trailer.
2. take the goods from the transfer table 90 and carry them to a storage compartment 176.
3. take the goods from the transfer table 90 and deposit them on the distribution conveyor 179.

The distribution conveyor 179 runs continuously in a counterclockwise direction and goods are transferred to and from the conveyor on the fly (that is, the stacker crane 120 and the conveyor runners 203 are moving in the same direction at the same speed when the transfer is effected). When goods are deposited on the conveyor, the reader-writer unit for that crane, which receives data from the computer, records pertinent data on the magnetic tape 204 on which the conveyor runners 203 are mounted. The information on the tape moves with the goods to indicate the location of the goods on the conveyor. Another stacker crane, operating in response to instructions from the computer and the reader-writer unit for that crane (which senses the signals encoded in the tape) takes the goods off the distribution conveyor. The goods can then either be stored in a storage compartment or carried to a transfer station for immediate transfer to a boom conveyor and a waiting trailer.

When a trailer is loaded, stacker cranes, operating in response to computer instructions, take goods from storage compartments. Only one crane normally delivers to a particular pair of opposing transfer stations, so only one crane can carry goods from close storage compartments to its associated transfer station through which all the goods must move to the trailer being loaded by its associated loading-unloading arms. The other cranes must transfer goods to the distribution conveyor for transport to the one crane which loads the particular transfer station through which the goods must pass.

Thus, by virtue of the arrangement of the automatic handling equipment, which is computer controlled in the embodiment of the invention shown, a large amount of freight is handled efficiently and with little manual effort.

Although the best mode contemplated for carrying out the present invention has been herein shown and described, it will be apparent that modification and variation may be made without departing from what is regarded to be the subject matter of the invention.

What is claimed is:

1. A freight handling terminal for transferring freight to and from freight carriers comprising a plurality of loading-unloading zones to receive the freight carriers, a plurality of loading-unloading conveyors each extending from one of the loading-unloading zones to carry freight to and from the freight carrier, a transfer zone at one end of each loading-unloading conveyor to receive freight from and transfer freight to each loading-unloading conveyor, at least one row of vertically stacked storage bins, at least two stacker cranes movable horizontally along at least said one row of storage bins, each stacker crane having load-handling means to transport freight to and from said storage bins and at least one transfer zone, and a distribution conveying means located in said terminal and spaced from said transfer zones to transfer freight between stacker cranes, a substantial portion of said distribution conveying means being parallel to and within reach of the path of travel of said stacker cranes whereby a load placed on said distribution conveying means by one of said plurality of stacker cranes can be removed therefrom by another one of said plurality of stacker cranes.

2. The apparatus of claim 1 including means to code the distribution conveying means to indicate the position thereon of particular freight, and means to read the code to control operation of the stacker cranes in transferring freight to and from the distribution conveying means.

3. The apparatus of claim 1 including means to code the storage bins, and means on the stacker cranes to scan the codes on the storage bins to control operation of the stacker cranes.

4. The apparatus of claim 1 in which storage bins are arrayed in at least two parallel rows.

5. The apparatus of claim 1 in which the distribution conveyor is endless.

6. The apparatus of claim 1 including means to coordinate the operation of the stacker cranes and the distribution conveyor means.

7. The apparatus of claim 1 including means to coordinate the operation of the load-unloader conveyors and the distribution conveyor means.

8. The apparatus of claim 1 including computer means to control the movement of the stacker cranes with respect to the storage bins, and the transfer stations, and the distribution conveying means.

9. The apparatus of claim 1 including a ramp at the end of at least some of said loader-unloader conveyors.

10. The apparatus of claim 9 in which each of said ramps is pivotal with respect to said loader-unloader conveyors.

11. The apparatus of claim 9 in which each of said ramps comprises two sets of article supporting members, one of said sets being movable with respect to the other of said sets to advance articles along the ramp.

12. The apparatus of claim 11 in which one of said sets of members retracts below the other set of members and advances above said other set of members to advance the articles in steps up the ramp.

13. The apparatus of claim 1 in which a stacker crane is operable to transfer a load at multiple positions along the distribution conveying means.

14. The apparatus of claim 1 including means to hold a load at the transfer station until one of the conveying means is ready to receive said load.

15. The apparatus of claim 1 in which said loader-unloader conveyor is a boom and including means inside the freight container to effect relative movement between said freight container and said booms.

16. A freight handling terminal for transferring freight to and from freight carriers comprising a plurality of loading-unloading zones to receive the freight carriers, a plurality of loading-unloading conveyors each extending from one of the loading-unloading zones to carry freight to and from the freight carrier, at least one row of vertically stacked storage bins, at least two stacker cranes movable horizontally along said storage bins, each stacker crane having load handling means to transport freight to and from the row of storage bins and at least one loading-unloading conveyor, and a distribution conveying means located in said terminal and spaced from said loading-unloading conveyors to transfer freight between stacker cranes, a portion of said distribution conveying means being operable to carry freight parallel to and within reach of the line of travel of said stacker cranes whereby a load placed on said distribution conveying means by one of said plurality of stacker cranes can be removed therefrom by another one of said plurality of stacker cranes.

FO-1050
(5/69)

UNITED STATES PATENT OFFICE
CERTIFICATE OF CORRECTION

Patent No. 3,613,910     Dated OCTOBER 19, 1971

Inventor(s) STANLEY M. WEIR

It is certified that error appears in the above-identified patent and that said Letters Patent are hereby corrected as shown below:

COLUMN 3, lINE 47:    Change "arm" to --ram--.

COLUMN 4, LINE 30:    Delete "for the loading-unloading" and insert --operator--.

COLUMN 7, LINE 3:    After "direction" insert --to reverse conveyor direction,--.

Signed and sealed this 19th day of September 1972.

(SEAL)
Attest:

EDWARD M. FLETCHER, JR.
Attesting Officer

ROBERT GOTTSCHALK
Commissioner of Patents